(12) United States Patent
Zamora Esquivel et al.

(10) Patent No.: US 11,257,291 B2
(45) Date of Patent: Feb. 22, 2022

(54) ARTIFICIAL IMAGINATION ENGINE USING 5D INFORMATION DESCRIPTORS

(71) Applicant: Intel Corporation, Santa Clara, CA (US)

(72) Inventors: Julio Zamora Esquivel, Zapopan (MX); Jose Rodrigo Camacho Perez, Guadalajara (MX); Hector Cordourier Maruri, Guadalajara (MX); Paulo Lopez Meyer, Zapopan (MX); Jesus Cruz Vargas, Zapopan (MX); Marcos Carranza, Portland, OR (US); Mateo Guzman, Beaverton, OR (US); Dario Oliver, Hillsboro, OR (US); Cesar Martinez-Spessot, Hillsboro, OR (US); Javier Turek, Beaverton, OR (US); Javier Felip Leon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/911,517

(22) Filed: Jun. 25, 2020

(65) Prior Publication Data
US 2020/0327731 A1   Oct. 15, 2020

(51) Int. Cl.
| | |
|---|---|
| *G06T 19/00* | (2011.01) |
| *G06N 3/04* | (2006.01) |
| *G06T 19/20* | (2011.01) |
| *G06F 3/01* | (2006.01) |
| *G06F 21/62* | (2013.01) |

(52) U.S. Cl.
CPC ............ *G06T 19/003* (2013.01); *G06F 3/011* (2013.01); *G06N 3/04* (2013.01); *G06T 19/20* (2013.01); *G06F 21/6245* (2013.01)

(58) Field of Classification Search
CPC ......... G06T 19/00; G06T 17/20; G06T 17/00; G06T 15/10; G06T 15/00; G06T 15/005; G06T 11/001; G06T 11/40; G06T 11/60
See application file for complete search history.

(56) References Cited

U.S. PATENT DOCUMENTS

| | | | | |
|---|---|---|---|---|
| 2019/0236307 | A1* | 8/2019 | Zibuschka | H04L 63/08 |
| 2020/0302185 | A1* | 9/2020 | Hussein | G06N 3/084 |

OTHER PUBLICATIONS

A. Graves et al., "Neural Turing Machine," Dec. 10, 2014, 26 pages, Google DeepMind, UK.
U. Khandelwal et al., "Generalization through Memorization: Nearest Neighbor Language Models," International Conference on Learning Representations (ICLR), 2019, 13 pages, Stanford University.
C. Szegedy et al., "Rethinking the inception architecture for computer vision," Dec. 11, 2015, 10 pages, Cornell University.

(Continued)

*Primary Examiner* — Todd Buttram
(74) *Attorney, Agent, or Firm* — Jordan IP Law, LLC

(57) ABSTRACT

Systems, apparatuses and methods may provide for origination camera technology that extracts data from multimodal sensor signals associated with a scene and generates a five-dimensional (5D) representation of the scene, wherein the 5D representation includes a three-dimensional (3D) visual representation, a one-dimensional (1D) temporal representation, and a 1D branch representation. The technology may also store the 5D representation as a set of abstract descriptors.

28 Claims, 10 Drawing Sheets

(56) References Cited

OTHER PUBLICATIONS

C. Szegedy et al., "Rethinking the inception architecture for computer vision," 2016, pp. 2818-2826, 2016 IEEE Conference on Computer Vision and Pattern Recognition (CVPR), Las Vegas, NV.
The Physics Arxiv Blog, "The Last AI Breakthrough DeepMind Made Before Google Bought It," <medium.com/the-physics-arxiv-blog/the-last-ai-breakthrough-deepmind-made-before-google-bought-it-for-400m->, retrieved on Jun. 23, 2020, 3 pages.

* cited by examiner

22

ARTIFICIAL IMAGINATION ENGINE USING 5D INFORMATION DESCRIPTORS

TECHNICAL FIELD

Embodiments generally relate to artificial intelligence (AI). More particularly, embodiments relate to artificial imagination engines that use five-dimensional (5D) descriptors.

BACKGROUND

In the context of AI, a "scene" may be considered as a set of actors/objects, their disposition in space, their characteristics and their relations one another (e.g., next to, on top, attached). A first challenge is that the amount of data that sensors generate is too much to be efficiently stored and indexed. A second challenge is that compressed scene representations are often not interpretable by humans.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
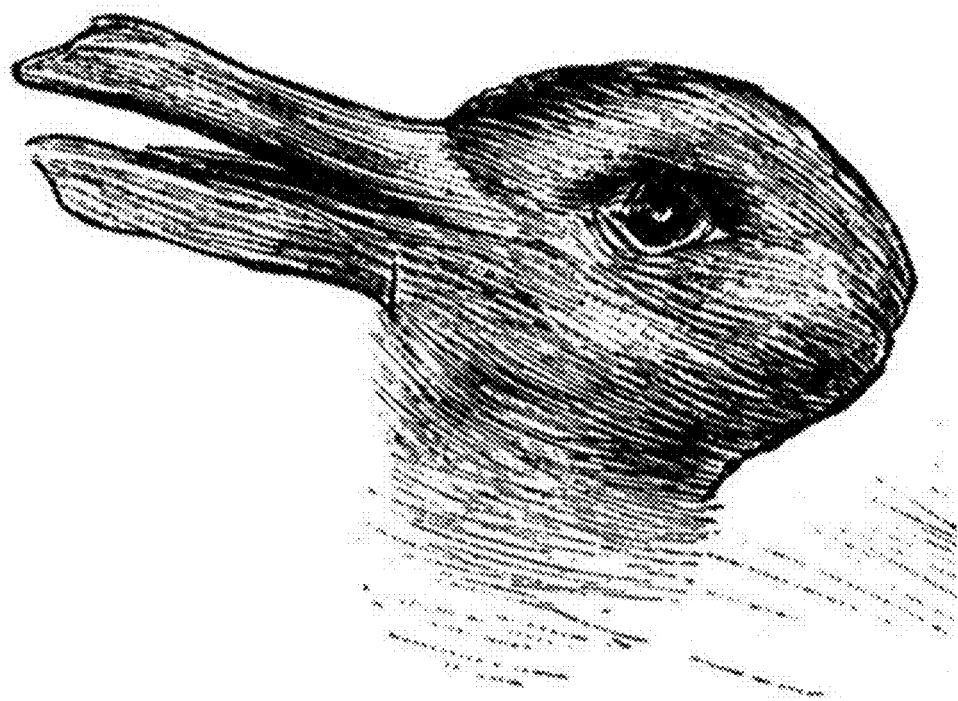
FIGS. 1A and 1B are illustrations of examples of images according to embodiments.

Humans capture the knowledge of every-day events without the need to remember every detail. Instead, humans understand what the main actors/objects are, their disposition in space, their characteristics and relations to each other and to the space they are in. When recalling an event, that knowledge is used to recreate it and missing details are filled in by imagination.

To address the amount of data that sensors generate, embodiments enable machines to preserve the full knowledge of the scene in a lightweight model. Additionally, to make compressed scene representations more interpretable by humans, embodiments recreate scenes with sufficient veracity to provide answers to questions about the scenes.

Solving these problems enables machines to naturally provide answers to ambiguous or subjective questions. Moreover, embodiments enable artificial imaginative processes that enhance machine reasoning capabilities. For example, the technology described herein may be used as part of a question and answer (Q&A) system, which—thanks to the abstract representation of scenes and events—is able to respond questions while preserving privacy of the actors involved in the events by filling details such as gender, age, aspect, from a built-in imagination of the system without the need to share sensitive information (e.g., explicit images, exact data or other personally identifiable information/PII).

Previously, the context of knowledge has been represented in several informatic models by means of graphs, ontologies, and logical prepositions. This has allowed comparing different concepts, and even calculating numerical distances and similarities between non-quantitative ideas. They mostly focus on the analysis of text, and all inference is extracted from data structures no images. Accordingly, existing representations are not natural (e.g., they do not necessarily need to follow the human way to think about a description, resulting in complex answers for some questions that require additional analysis or information). When implemented in modern intelligent agent systems (e.g., SIRI, CORTANA, ALEXA, BIXBY, GOOGLE assistant, etc.), the information exchange between the user and the system acts more like a limited command and control interaction. The functionality of these systems follows an internal state machine that can be restarted at any time. Moreover, the previously described approaches lack the capability to fill in knowledge gaps or imagine details (e.g., that might be privacy sensitive) by generating them without significantly altering the quality of the response.

Understanding a "scene" as a series of actors/objects, their disposition in space, their characteristics (e.g. material properties, semantics) and their relations to each other, this IDF discloses an artificial imagination system that: captures scene information from multi-modal sensory inputs (audio, video, text, positioning, physiological, meteorological, etc.); creates an artificial scene comprising a collection of actors/objects in a location, their characteristics and their relationships in space and time; processes the artificial scene to create additional information ("fill in the blanks") to result in an artificial "5D scene" (including 3D space+time+branching scenes); and processes the 5D scene to make assumptions and respond to inquiries about it.

Embodiments may be analogous to the way humans remember events, and how we "fill the blanks" by using our imagination (creating branching options that were not in the original information). For this purpose, a Deep Learning (DL) solution extracts knowledge from the multi-modal sensory inputs, to create a 5D quantized and efficient information feature representation of a story, combined with a DL solution, like a Generative Adversarial Network (GAN) that reinterprets the story, putting together a common representation of video, text, and sound.

Accordingly, embodiments can retrieve relevant information from signals captured by available sensors, e.g. cameras, simple text, or microphones (e.g., multimodality). Embodiments may also collect memories that can be refined or augmented based on human input and perception. Additionally, embodiments can combine the image (e.g., knowledge extraction) with the comments in the images of social media for sentiment analysis and as context input. Moreover, embodiments may formulate coherent, natural, and understandable answers, and can also infer based on its understanding of the captured stories, instead of a preprogramed answer. In addition, embodiments may produce answers with some error of missing gaps, and improve understanding based on the feedback from the user. Embodiments may also produce answers while preserving privacy, which is useful in certain scenarios such as enterprise (e.g., internal) security systems. Indeed, embodiments enable video analytic solutions to be used on different Internet of Things (IoT) verticals. Accordingly, organizations encountering privacy issues in digital transformation projects may benefit from the technology described herein.

The evolution of the image analysis is growing faster compared the text analysis, using convolutional neural networks, it is possible: segment, detection and classification along with visual understanding. Using this mature model, the knowledge may be written in terms of images and reinterpret them when it is needed. Additionally, embodiments may use a static image and some text coming from audio to create a three-dimensional (3D) image with motion, with a re-interpretation detects and explains it as an activity.

As a result, embodiments may be a critical building block for natural language Q&A systems by handling multimodal perception, memories and context. Such an approach may be particularly advantageous to organizations interested in building custom assistants or as an enhancement for preexisting solutions such as, for example, SIRI, CORTANA, ALEXA, BIXBY, GOOGLE assistant, etc.

In one example, the size of the memory used to save the description of a scene or a piece of context may be reduced. In another example, deployment of the technology described herein may be detected by using as input a piece of text that is known to generate a specific 5D scene representation followed by specific set of questions about the scene. For example, riddles (e.g., "I have wings and able to fly, I'm not a bird yet I soar high in the sky. What am I?") and the known internal representation generated by the system may be used together to ask specific questions about the internal representation.

Figure 1B:
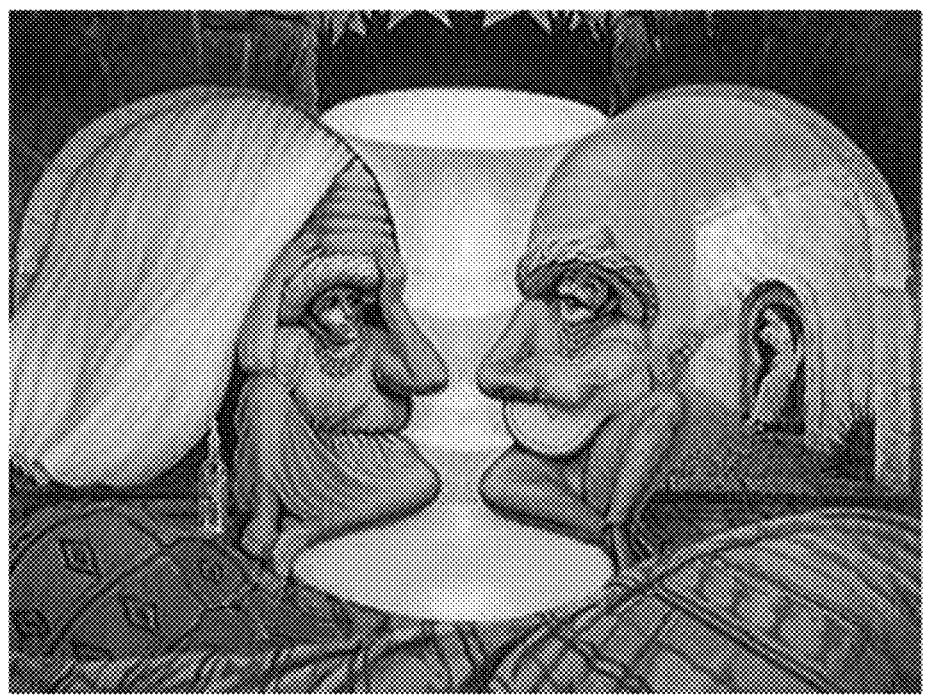

FIGS. 1A and 1B demonstrate that besides text, a set of images may be pre-defined to generate a pre-known 5D scene and questions about that scene. Images 20, 22, respectively, with multiple interpretations may be mapped to a known 5D representation that can be queried to determine if the technology described herein is being used.

Similarly, a piece of pre-defined audio to generate a pre-known 5D scene and questions about that scene can be used as well to detect the presence of embodiments. For a specific use case such as, for example, smart buildings monitoring and privacy, the information stored may be checked to detect the presence of embodiments. If no pictures, faces or audio are stored, but the system allows queries for historic events with enough detail, then embodiments may be present (e.g., I can query how many people using red shirt were working on Mar. 3, 2020 at 10:30 am). Moreover, multi-modal sensor data processing systems that advertise capabilities such as privacy preserving multi-modal event logging, visual Q&A capabilities with multiple responses and randomized details, low memory usage may indicate the use of the technology described herein.

Embodiments propose a process that is analogous to human imagination, knowledge of a given scene is obtained via multi-modal sensing and converted to a space-time-object based 5D abstract representation and stored in memory. The representation can be recovered at any time and used to generate answers to queries about the scene. Missing details are automatically filled in by the imagination system and privacy sensitive information is replaced with imagined data that keeps the scene consistent and can answer the questions by filling in the blanks left by missing or sensitive data.

Memory is a very active area of scientific research as part of the human mind. It is understood that humans' long-term memory is not "photographic", like a digital memory, but "semantic". Retrieving memories uses certain key information that might be indeed true, while imagination is used to "fill in the blanks" and recreate the stories as the original experience.

Figure 2:
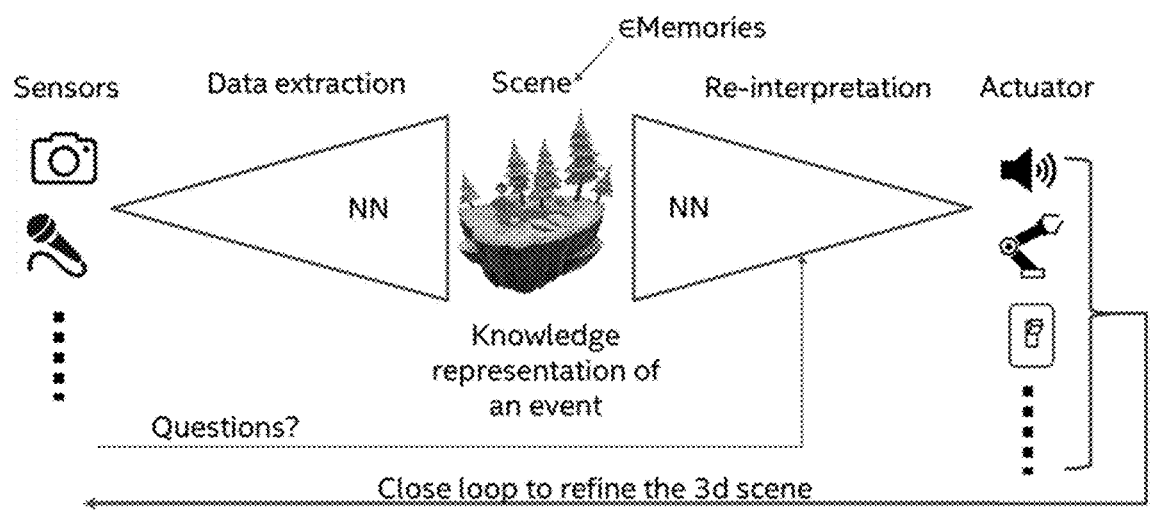
FIG. 2 is a block diagram of an example of a 5D knowledge generation through neural networks and a re-interpretation of a story through generative adversarial networks (GANs) according to an embodiment.

As shown in FIG. 2, a system 30 may include five main parts.

1) Sensing devices may capture information from the real world.

2) Data extraction involves a combination of different types of Neural Networks (NN) that process natural language, sound and video, to extract information and feed it to the representation module.

3) Scene representation generates novel 5D abstract knowledge representation, similar to a moving picture, that encodes the story, i.e. a sequence of scenes.

4) Re-interpretation reconstructs a scene representation that is semantically consistent with the scene described by the input signals that can be used to answer questions about the original story/scene. Here is where the imagination fills in missing or sensitive details with semantically consistent but generated data.

5) Question responses are provided using a common representation of video, text and sound.

The benefits of the embodiments are mainly focused in the data extraction process, representation, imagination and re-interpretation modules.

Figure 3:
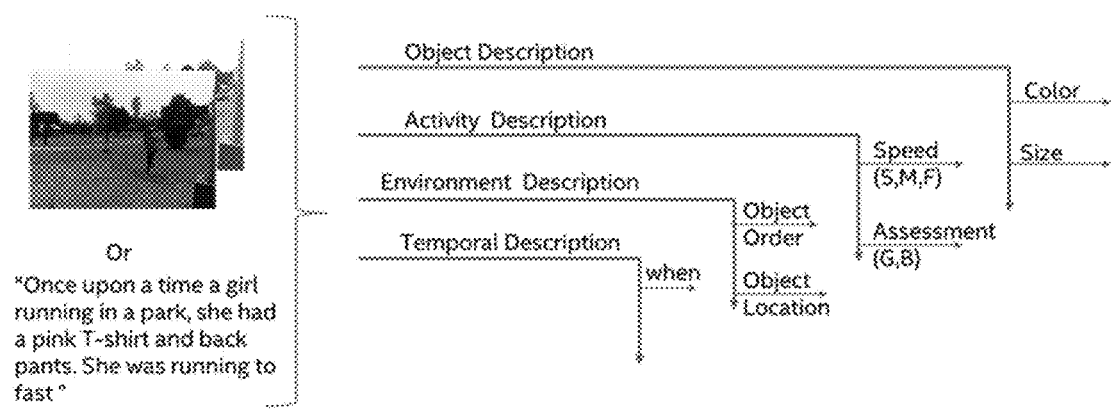
FIG. 3 is a block diagram of an example of a property extraction of objects in a scene/story according to an embodiment.

FIG. 3 shows a data extraction 40 where input data devices can be cameras, microphones, text or any other method to feed information into the scenes (e.g., information available in social media, or online open documents and eBooks).

Figure 4:
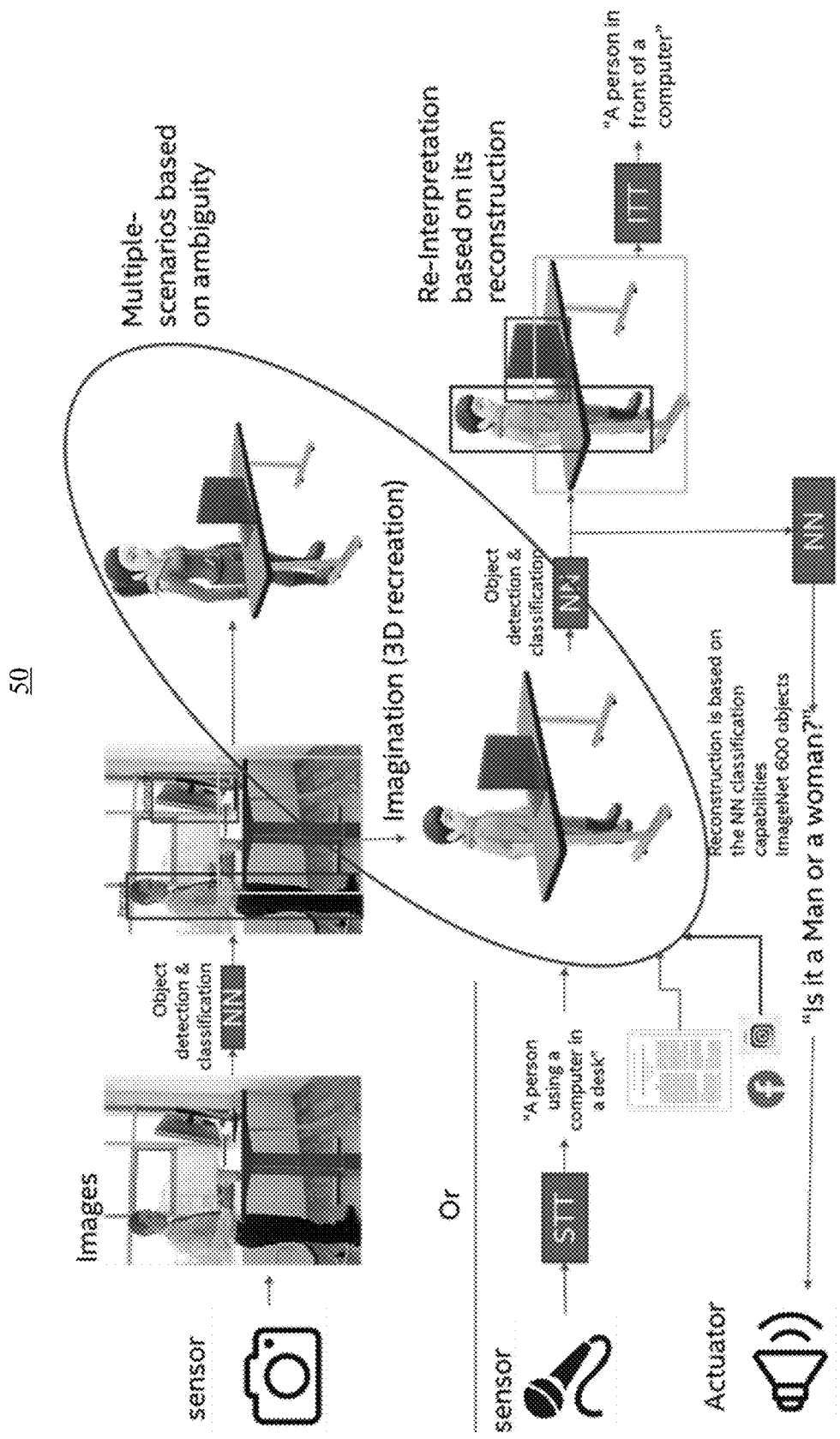
FIG. 4 is an illustration of an example of technology to deal with ambiguity when extracting objects and generating a 5D knowledge feature.

FIG. 4 demonstrates a 5D scene representation 50 in which all of the information required to recreate a full scene will not always be available, so some properties might be undefined. A parallel scene will be generated to handle the ambiguity. When a property is required/mandatory, the system can ask the user to define such property in more detail before creating the 5D scene representation 50.

Figure 5:
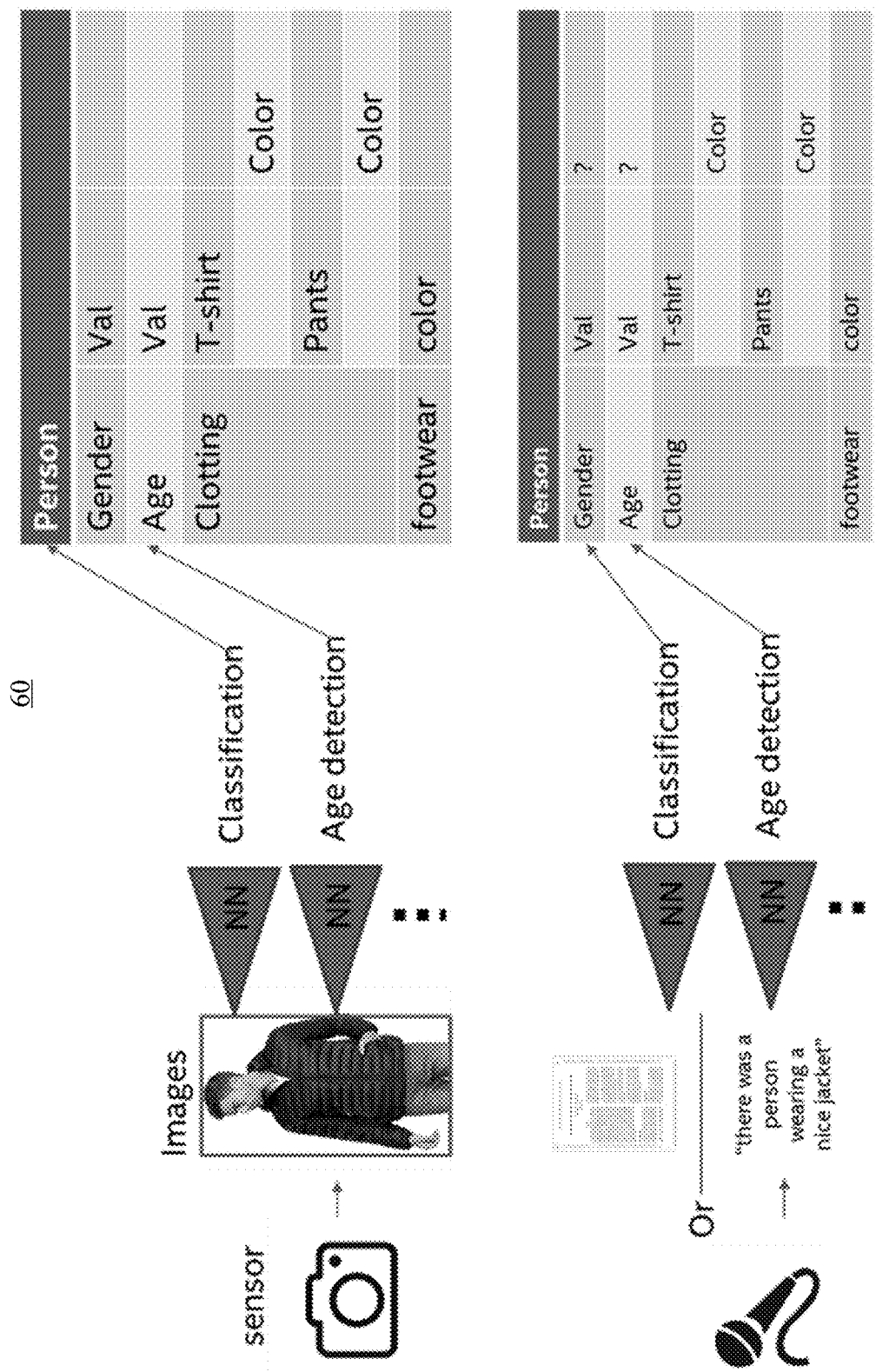
FIG. 5 is an illustration of an example of the output of 5D knowledge representations for different types of inputs according to an embodiment.

FIG. 5 demonstrates in an output 60 that the NN to extract information from input sensors are evaluated hierarchically, for example, if there is a person it calls gender, age, etc. T-shirt calls color extraction and so on.

Figures 6A, 6B:
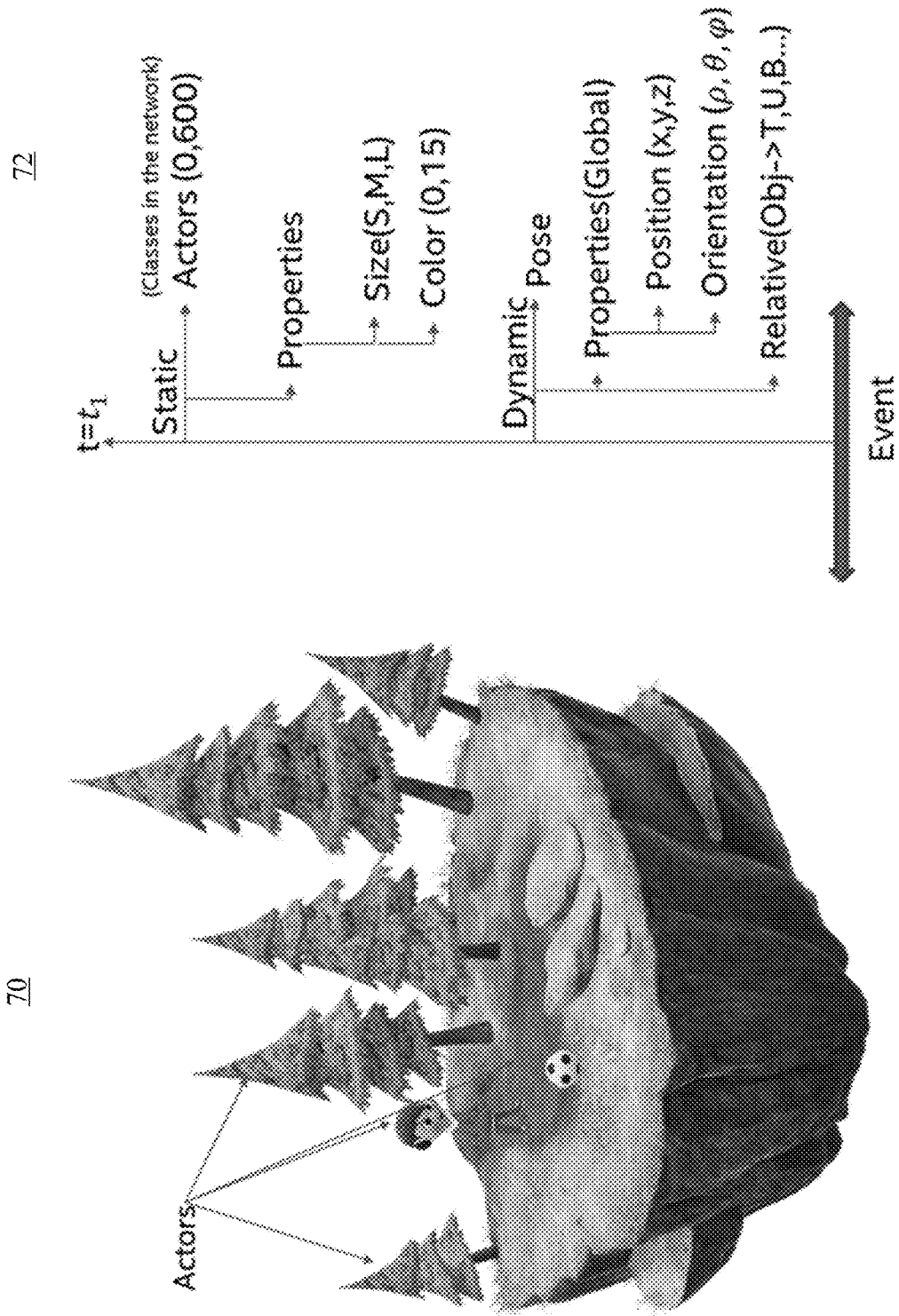
FIG. 6A is an illustration of an example of an abstract representation of a scene using objects defines as actors, detected by a neural network according to an embodiment.
FIG. 6B is an illustration of an example of static and dynamic objects according to an embodiment.

Turning now to FIGS. 6A and 6B, a definition 72 of a 5D abstract scene 70 is like the traditional 3D files of video games or CAD software, a 3D rendered representation of the scene, with the only difference of the quantization of properties like color, size, position, etc. Then, every object in the scene is an actor, and the set of possible generic objects used is equal to the number of classes of the INCEPTION V2 NN (e.g., 602 objects). In one example, the maximum number of objects in a scene is 100. The scene is 5-dimensional because it is a 3D spatial representation changing over time. And the consideration of multiple possibilities (ambiguity in the recreation of a scene) represents the 5th dimension.

An object instance has identity (e.g., each object instance is a different individual entity). An object has state (e.g., the object has various properties, which might change). An object has behavior (e.g., the object may do things and may have things done to the object). All of identities, states and behaviors may be referred to as the object characteristic.

The quantization avoids an infinite number of parallel scenarios (e.g., 3D representations) generated by the known parameters. To save memory, the properties of objects are divided into static and dynamic as shown in FIG. 6B. For the static objects, a copy is not needed for every time sample because the position will be the same. For the dynamic objects, the position is sampled in different points of the time.

Figure 7:
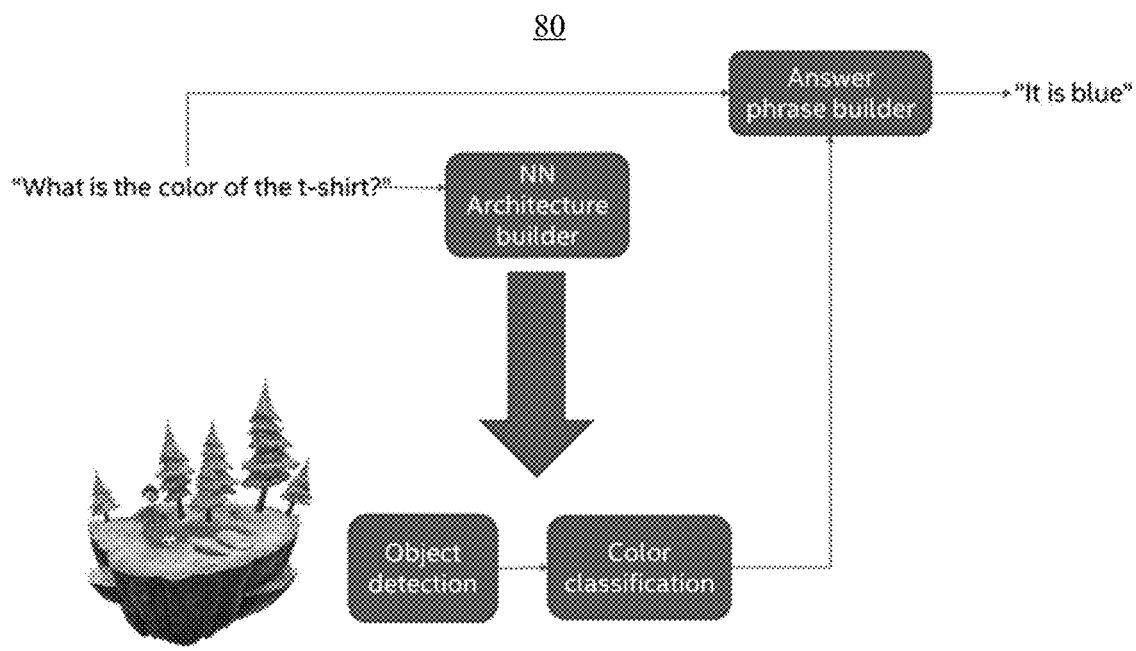
FIG. 7 is a block diagram of an example of a re-interpretation of a scene based on a user query according to an embodiment.

Turning now to FIG. 7, when a user asks for information related with a particular scene, the system uses its GAN to conduct a re-creation 80 of artificial images using the stored 5D abstract representation to answer the questions. Then, a set of NN classifiers are used to extract object properties and the activity description from a sequence of images, audio, or text, for the sequence of generated 3D scenes. All classifiers are pretrained networks such as, for example, INCEPTION, YOLO, etc. The GANs traditionally used to create 2D images are used here to create 3D scenes.

Object detection: Inception V2 (602 classes)
Object description: Custom internally created
Activity recognition: Internally created (50 classes)

As already noted, the retrieval questions from the user are applied to the re-interpretation scene, composing a combination of blocks to extract the required data to provide the correct message.

Figure 8:
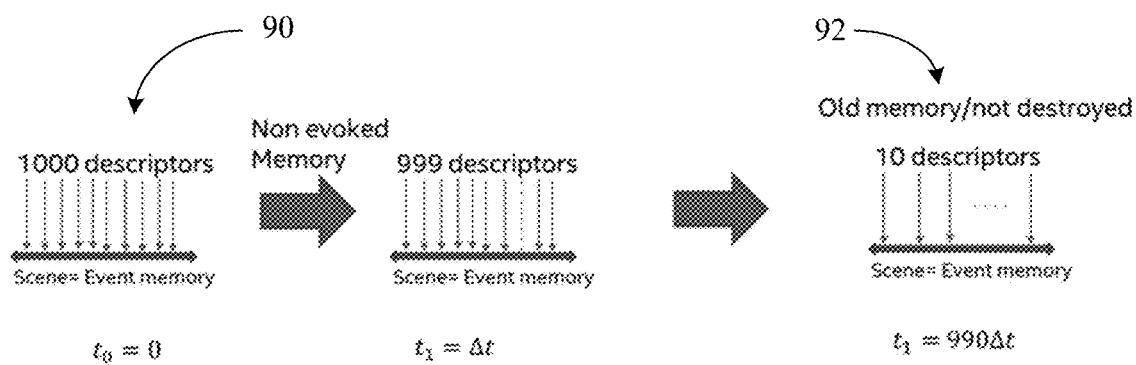
FIG. 8 is an illustration of an example of a compression of 5D knowledge descriptors based on recall history according to an embodiment.

FIG. 8 demonstrates that in addition to the core modules described, a memory management system may take care of determining which memories to keep or which memories to discard. The memories are scenes formed by a combination of 5D abstract knowledge descriptors. Every descriptor contains the information of the object's properties in the scene and an activity for each object. Such descriptors may be compressed by dropping details of descriptors that are not relevant for the core information and could be generated in the re-interpretation by the GAN, in order to save memory for scenes that are not often or eventually recalled (e.g., or some other query relevance metric).

In the illustrated example, an initial number of descriptors 90 generated to define a scene is reduced when such scenes are not recalled. Thus, if after a predefined period any unused scene will lose one of the descriptors ending with, for example, only ten descriptors 92 in a very large period of time. In this case, the scene will be very similar to the original, but the details of what exactly happened will get lost.

Figure 9:
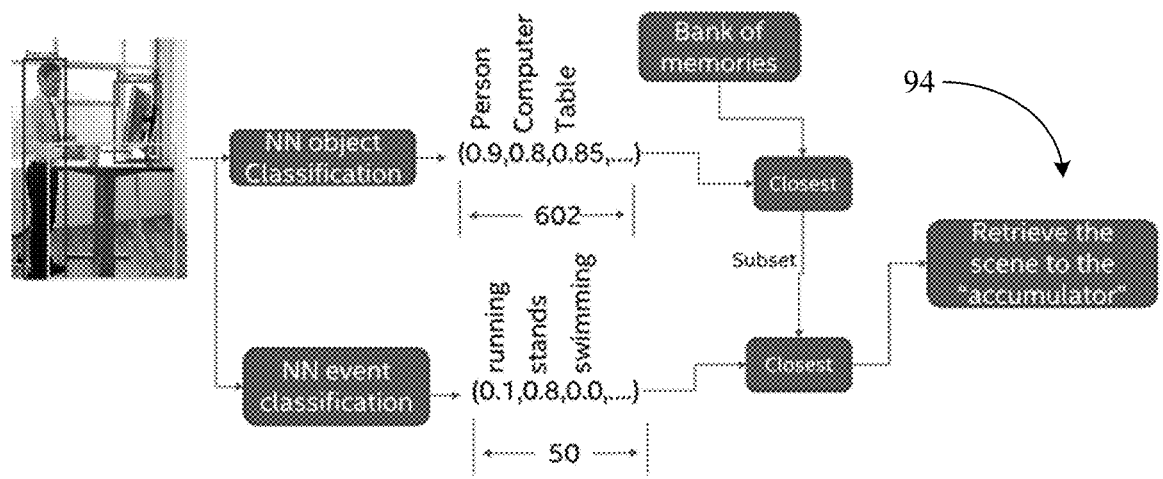
FIG. 9 is a flow diagram of an example of scene recall according to an embodiment.

FIG. 9 demonstrates that a scene may be recalled using a hashtag generated by, for example, INCEPTION V2. Basically, the location of the objects is not used for the hashtag generation. Rather, only the 602-dimensions descriptor generated by INCEPTION V2 is used. Embodiments compute the distance of any scene in memory to get the closest one and bring it to the accumulator 94.

Embodiments therefore enable the creation of a natural artificial intelligent assistant via optimized silicon products. Instead of working in a rather limited and restricted fashion (e.g., processing the user commands or queries to generate a response following predefined rules, where all answers are pre-loaded and embedded into an app or a skill), embodiments provide answers of complex questions that are more useful than "I don't know that" or "I am having a hard time to answer that" pre-recorded phrases. Embodiments take multi-modal sensor input and answer the question based on the scene so that if the information is present, the system will deliver the information to the end user.

Embodiments propose a DL solution to extract relevant knowledge from images, text, and sound, in order to create a 5D quantized knowledge representation of a scene, combined with a GAN solution that reinterprets the 5D scene to provide an answer based on its re-interpretation of the 5D scene (e.g., piece of knowledge), presenting to the user a common representation of video, text and sound.

Rather than merely being a neural network to train, embodiments include a collection of a pretrained neural networks managed in several main sections to multimodally build a 3D scene and provide a rendering pipeline like DirectX 12 (DX12) or OpenGL (OGL), the same engine that generates the 3D image is reused to reinterpret the scene feeding the 3D image as input, instead of the camera. Additionally, another section creates a question solver by connecting the existing modules to extract the specific requested knowledge. Images also manage scalability by using new models to extract new features that may be incorporated over time to answer broader questions.

The missing data may be assumed (e.g., the data is allowed to be incorrect). For instance, if an object is detected via the text or image, but size is not present, we the average size of this type of object may be used (e.g., pre-defined for every object on the 602 supported objects). If the user clarifies that the object was actually larger, the size automatically jumps to the next larger size in the predefined sizes.

APPLICATION EXAMPLES

Smart buildings and privacy: it is common in smart buildings to use video feeds to analyze and understand the use of the infrastructure. Privacy may be a factor in such a setting, and so regulations may exist for limiting video recordings. The same happens with some Human Resources department from private companies, in which the privacy of employees is non-negotiable. An example of this type of implementation is the continuous monitoring of desks usage in common areas with the goal to improve space management. This is an area that could significantly reduce costs. Since this use cases do not require specific video evidence (e.g., because the use is not for security/surveillance), it is possible to only store the 5D scene in order to be able to make other queries in the future (e.g., depending on the features/objects being recorded as part of the scene). For example, additional queries not initially considered may be related to traffic flow analysis (e.g., number of people, most frequent trajectories, peak traffic times per area, etc.)

In a surveillance system, after storage of the 5D scene, the stored data may enable regular operators to conduct general querying, while protecting the identity of the individuals. Depending on auditing requirements, the video may be also persisted after encryption, where only an operator with relatively high privileges may decrypt the information.

Figure 10:
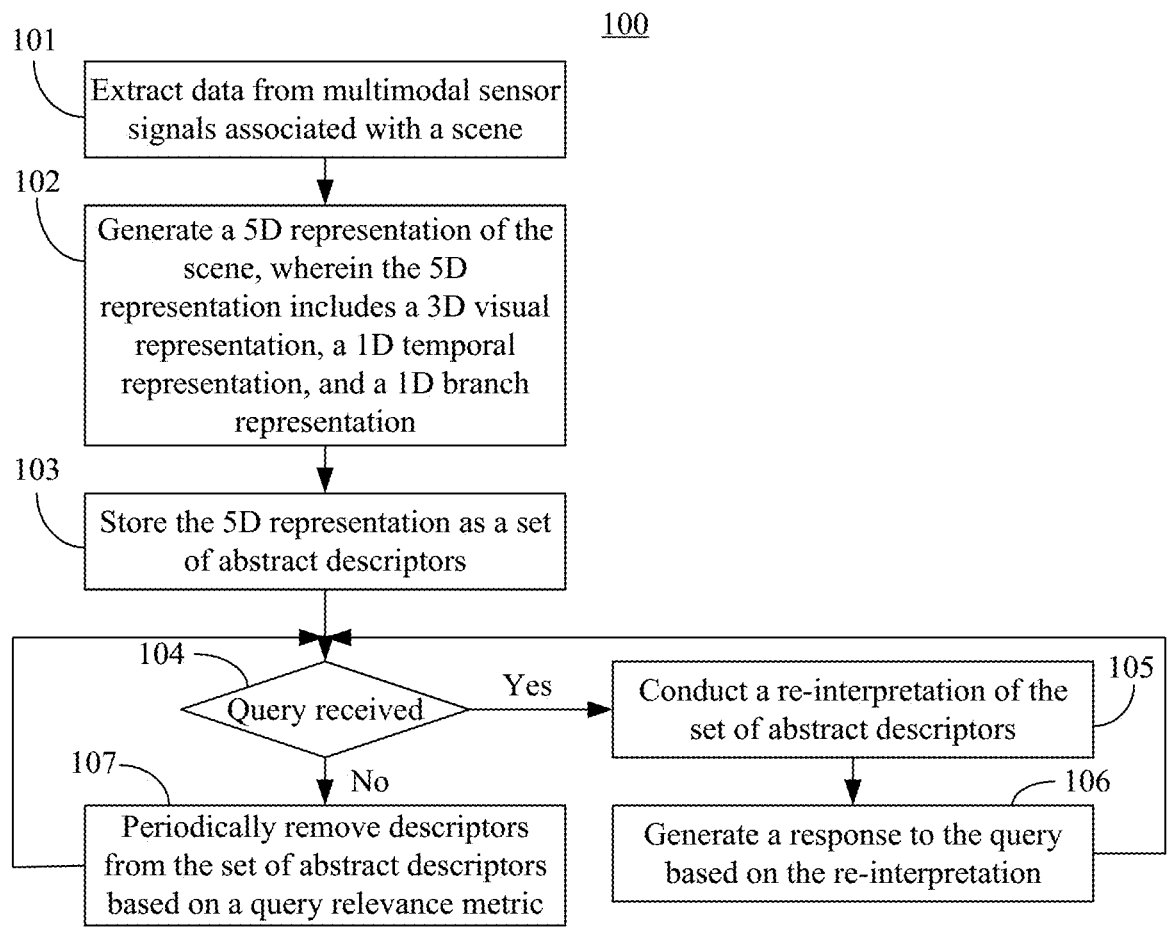
FIG. 10 is a flowchart of an example of a method of operating a performance-enhanced computing system according to an embodiment.

FIG. 10 shows a method 100 of operating a performance-enhanced computing system. The method 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 101 provides for extracting data from multimodal sensor signals associated with a scene, where block 102 generates a 5D representation of the scene. In the illustrated example, the 5D representation includes a 3D visual representation, a 1D temporal representation, and a 1D branch representation. In an embodiment, block 101 extracts the data via a neural network. The 5D representation may be stored as a set of abstract descriptors at block 103. In one example, block 103 involves excluding personally identifiable information (PII) from the set of abstract descriptors. Illustrated block 104 determines whether a query regarding the scene has been detected. If so, a re-interpretation of the set of abstract descriptors may be conducted at block 105. In an embodiment, block 105 conducts the re-interpretation via a neural network. Illustrated block 106 generates a response to the query based on the re-interpretation. The method 100 may then return to block 104. If it is determined at block 104 that a query has not been detected, block 107 may periodically remove descriptors from the set of abstract descriptors based on a query relevance metric and return to block 104.

Figure 11:
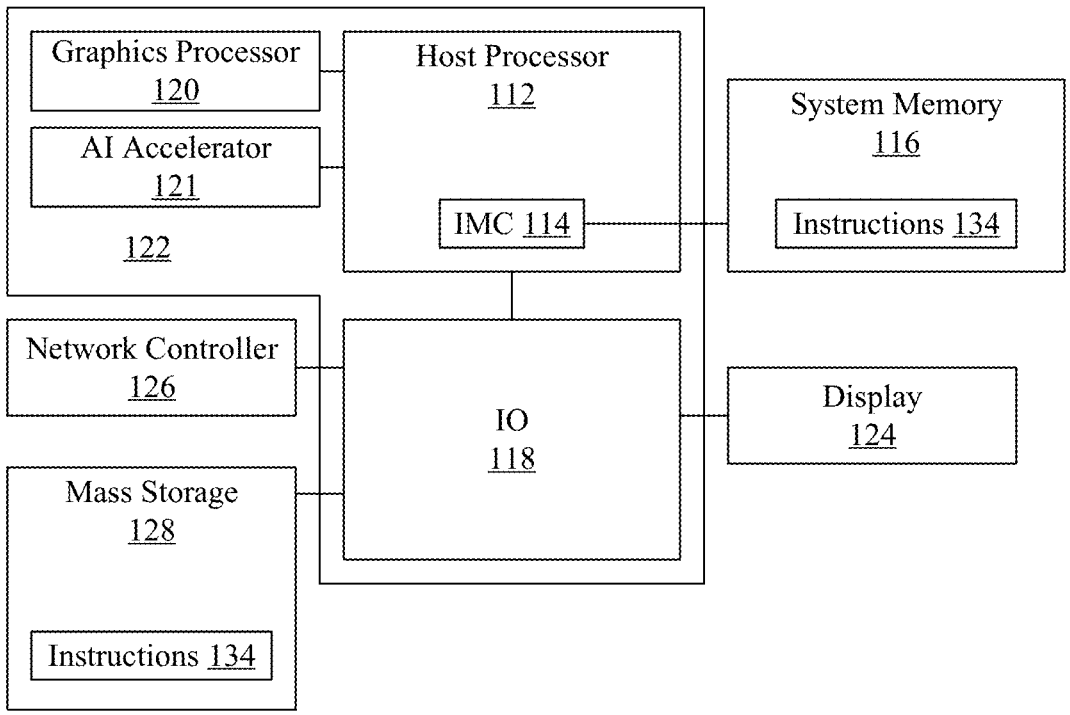
FIG. 11 is a block diagram of an example of a performance-enhanced computing system according to an embodiment.

Turning now to FIG. 11, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 110 includes a host processor 112 (e.g., central processing unit/CPU) having an integrated memory controller (IMC) 114 that is coupled to a system memory 116.

The illustrated system 110 also includes an input output (IO) module 118 implemented together with the host processor 112, an AI (artificial intelligence) accelerator 121 and a graphics processor 120 (e.g., graphics processing unit/GPU) on a semiconductor die 122 as a system on chip (SoC). In an embodiment, the semiconductor die 122 also includes a vision processing unit (VPU, not shown). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory).

In an embodiment, the host processor 112, the graphics processor 120, the AI accelerator 121, the VPU and/or the IO module 118 execute program instructions 134 retrieved from the system memory 116 and/or the mass storage 128 to perform one or more aspects of the method 100 (FIG. 10), already discussed.

Figure 12:
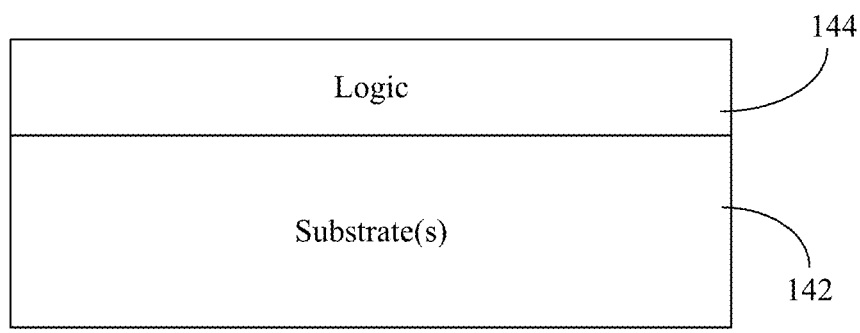
FIG. 12 is an illustration of an example of a semiconductor apparatus according to an embodiment.

FIG. 12 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. Thus, the logic 144 might include a host processor, a graphics processor, an AI accelerator, a VPU, an IO module, etc., or any combination thereof. In one example, the logic 144 implements one or more aspects of the method 100 (FIG. 10), already discussed.

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 13:
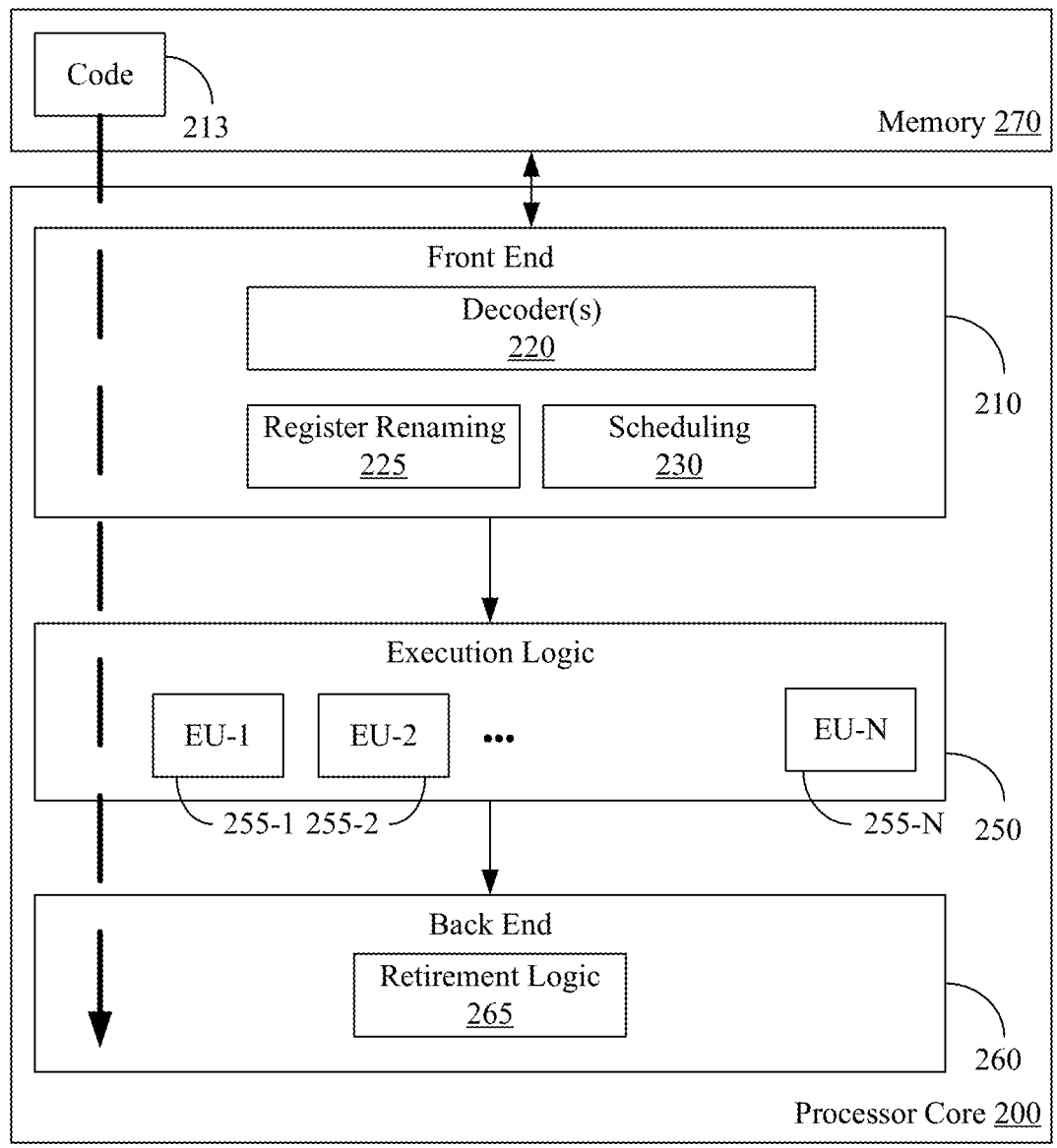
FIG. 13 is a block diagram of an example of a processor according to an embodiment.

FIG. 13 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 13, a processing element may alternatively include more than one of the processor core 200 illustrated in FIG. 13. The processor core 200 may be a single-threaded core or, for at least one embodiment, the processor core 200 may be multithreaded in that it may include more than one hardware thread context (or "logical processor") per core.

FIG. 13 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 100 (FIG. 10), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 13, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 14:
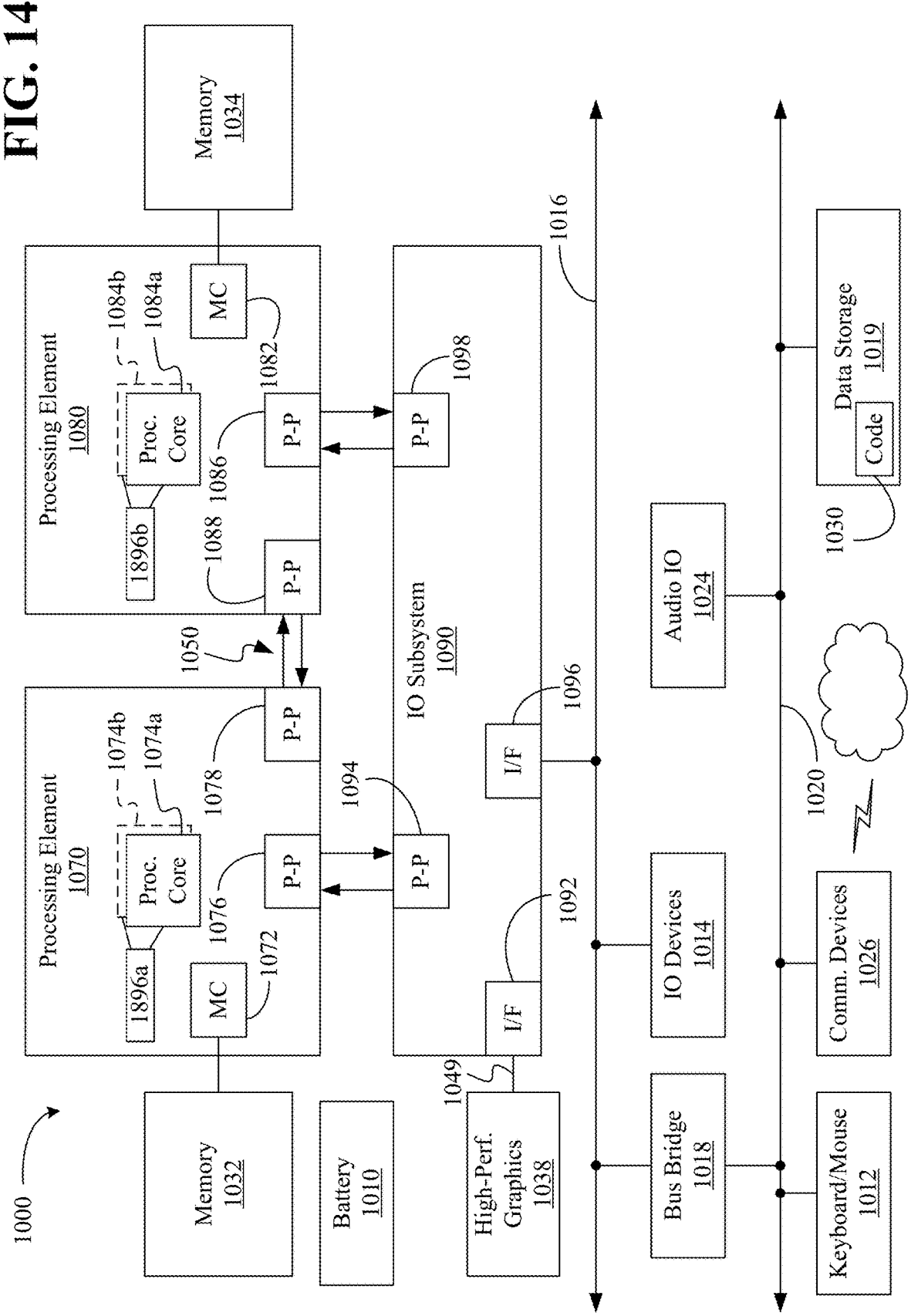
FIG. 14 is a block diagram of an example of a multi-processor based computing system according to an embodiment.

Referring now to FIG. 14, shown is a block diagram of a computing system 1000 embodiment in accordance with an embodiment. Shown in FIG. 14 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 14 may be implemented as a multi-drop bus rather than point-to-point interconnect.

As shown in FIG. 14, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 13.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 14, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 14, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 14, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of method 70 (FIG. 6A) and/or the method 80 (FIG. 6B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 14, a system may implement a multi-drop bus or another such communication topology. Also, the elements of FIG. 14 may alternatively be partitioned using more or fewer integrated chips than shown in FIG. 14.

ADDITIONAL NOTES AND EXAMPLES

Example 1 includes a computing system comprising a set of sensor devices to generate multimodal sensor signals associated with a scene, a memory, and a processor coupled to the set of sensor devices and the memory, wherein the processor includes logic coupled to one or more substrates, the logic coupled to the one or more substrates to extract data from the multimodal sensor signals, generate a five-dimensional (5D) representation of the scene, wherein the 5D representation includes a three-dimensional (3D) visual representation, a one-dimensional (1D) temporal representation, and a 1D branch representation, and store the 5D representation to the memory as a set of abstract descriptors.

Example 2 includes the computing system of Example 1, wherein the logic coupled to the one or more substrates is to detect a query regarding the scene, conduct a re-interpretation of the set of abstract descriptors in response to the query, and generate a response to the query based on the re-interpretation.

Example 3 includes the computing system of Example 2, wherein the re-interpretation is to be conducted via a neural network.

Example 4 includes the computing system of Example 1, wherein the logic coupled to the one or more substrates is to periodically remove descriptors from the set of abstract descriptors based on a query relevance metric.

Example 5 includes the computing system of Example 1, wherein the data is to be extracted via a neural network.

Example 6 includes the computing system of any one of Examples 1 to 5, wherein the logic coupled to the one or more substrates is to exclude personally identifiable information from the set of abstract descriptors.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to extract data from multimodal sensor signals associated with a scene, generate a five-dimensional (5D) representation of the scene, wherein the 5D representation includes a three-dimensional (3D) visual representation, a one-dimensional (1D) temporal representation, and a 1D branch representation, and store the 5D representation as a set of abstract descriptors.

Example 8 includes the apparatus of Example 7, wherein the logic coupled to the one or more substrates is to detect a query regarding the scene, conduct a re-interpretation of the set of abstract descriptors in response to the query, and generate a response to the query based on the re-interpretation.

Example 9 includes the apparatus of Example 8, wherein the re-interpretation is to be conducted via a neural network.

Example 10 includes the apparatus of Example 7, wherein the logic coupled to the one or more substrates is to periodically remove descriptors from the set of abstract descriptors based on a query relevance metric.

Example 11 includes the apparatus of Example 7, wherein the data is to be extracted via a neural network.

Example 12 includes the apparatus of any one of Examples 7 to 11, wherein the logic coupled to the one or more substrates is to exclude personally identifiable information from the set of abstract descriptors.

Example 13 includes at least one computer readable storage medium comprising a set of executable program instructions, which when executed by a computing system, cause the computing system to extract data from multimodal sensor signals associated with a scene, generate a five-dimensional (5D) representation of the scene, wherein the 5D representation includes a three-dimensional (3D) visual representation, a one-dimensional (1D) temporal representation, and a 1D branch representation, and store the 5D representation as a set of abstract descriptors.

Example 14 includes the at least one computer readable storage medium of Example 13, wherein the instructions, when executed, further cause the computing system to detect a query regarding the scene, conduct a re-interpretation of the set of abstract descriptors in response to the query, and generate a response to the query based on the re-interpretation.

Example 15 includes the at least one computer readable storage medium of Example 14, wherein the re-interpretation is to be conducted via a neural network.

Example 16 includes the at least one computer readable storage medium of Example 13, wherein the instructions, when executed, further cause the computing system to periodically remove descriptors from the set of abstract descriptors based on a query relevance metric.

Example 17 includes the at least one computer readable storage medium of Example 13, wherein the data is to be extracted via a neural network.

Example 18 includes the at least one computer readable storage medium of any one of Examples 13 to 17, wherein the instructions, when executed, further cause the computing system to exclude personally identifiable information from the set of abstract descriptors.

Example 19 includes a method comprising extracting data from multimodal sensor signals associated with a scene, generating a five-dimensional (5D) representation of the scene, wherein the 5D representation of the scene includes a three-dimensional (3D) visual representation, a one-dimensional (1D) temporal representation, and a 1D branch representation, and storing the 5D representation as a set of abstract descriptors.

Example 20 includes the method of Example 19, further including detecting a query regarding the scene, conducting a re-interpretation of the set of abstract descriptors in response to the query, and generating a response to the query based on the re-interpretation.

Example 21 includes the method of Example 20, wherein the re-interpretation is conducted via a neural network.

Example 22 includes the method of Example 19, further including periodically removing descriptors from the set of abstract descriptors based on a query relevance metric.

Example 23 includes the method of Example 19, wherein the data is extracted via a neural network.

Example 24 includes the method of any one of Examples 19 to 23, further including excluding personally identifiable information from the set of abstract descriptors.

Example 25 includes means for performing the method of any one of Examples 19 to 24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of may mean any combination of the listed terms. For example, the phrases "one or more of" A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
    a set of sensor devices to generate multimodal sensor signals associated with a scene;
    a memory; and
    a processor coupled to the set of sensor devices and the memory, wherein the processor includes logic coupled to one or more substrates, the logic coupled to the one or more substrates to:
        extract data from the multimodal sensor signals,
        generate a five-dimensional (5D) representation of the scene, wherein the 5D representation includes a three-dimensional (3D) visual representation, a one-dimensional (1D) temporal representation, and a 1D branch representation, and
        store the 5D representation to the memory as a set of abstract descriptors;
    wherein properties of objects in the scene are divided into static properties and dynamic properties such that static properties of objects are not sampled for each time sample of the scene,
    wherein the 1D branch representation represents ambiguity in the scene resulting from an undefined property for an object in the scene, and
    wherein when the undefined property is mandatory, a user is queried to define the property in more detail before generating the 5D representation of the scene.

2. The computing system of claim 1, wherein the data is to be extracted via a neural network.

3. The computing system of claim 1, wherein the logic coupled to the one or more substrates is to exclude personally identifiable information from the set of abstract descriptors.

4. A computing system comprising:
    a set of sensor devices to generate multimodal sensor signals associated with a scene;
    a memory; and
    a processor coupled to the set of sensor devices and the memory, wherein the processor includes logic coupled to one or more substrates, the logic coupled to the one or more substrates to:
        extract data from the multimodal sensor signals,
        generate a five-dimensional (5D) representation of the scene, wherein the 5D representation includes a three-dimensional (3D) visual representation, a one-dimensional (1D) temporal representation, and a 1D branch representation,
        store the 5D representation to the memory as a set of abstract descriptors,
        detect a query regarding the scene,
        conduct a re-interpretation of the set of abstract descriptors in response to the query, and
        generate a response to the query based on the re-interpretation.

5. The computing system of claim 4, wherein the re-interpretation is to be conducted via a neural network.

6. A computing system comprising:
    a set of sensor devices to generate multimodal sensor signals associated with a scene;
    a memory; and
    a processor coupled to the set of sensor devices and the memory, wherein the processor includes logic coupled to one or more substrates, the logic coupled to the one or more substrates to:
        extract data from the multimodal sensor signals,
        generate a five-dimensional (5D) representation of the scene, wherein the 5D representation includes a three-dimensional (3D) visual representation, a one-dimensional (1D) temporal representation, and a 1D branch representation,
        store the 5D representation to the memory as a set of abstract descriptors, and
        periodically remove descriptors from the set of abstract descriptors based on a query relevance metric.

7. The computing system of claim 6, wherein after a predefined period, any unused scene loses one descriptor of the set of abstract descriptors.

8. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
extract data from multimodal sensor signals associated with a scene;
generate a five-dimensional (5D) representation of the scene, wherein the 5D representation includes a three-dimensional (3D) visual representation, a one-dimensional (1D) temporal representation, and a 1D branch representation; and
store the 5D representation as a set of abstract descriptors;
wherein properties of objects in the scene are divided into static properties and dynamic properties such that static properties of objects are not sampled for each time sample of the scene,
wherein the 1D branch representation represents ambiguity in the scene resulting from an undefined property for an object in the scene, and
wherein when the undefined property is mandatory, a user is queried to define the property in more detail before generating the 5D representation of the scene.

9. The apparatus of claim 8, wherein the data is to be extracted via a neural network.

10. The apparatus of claim 8, wherein the logic coupled to the one or more substrates is to exclude personally identifiable information from the set of abstract descriptors.

11. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
extract data from multimodal sensor signals associated with a scene;
generate a five-dimensional (5D) representation of the scene, wherein the 5D representation includes a three-dimensional (3D) visual representation, a one-dimensional (1D) temporal representation, and a 1D branch representation;
store the 5D representation as a set of abstract descriptors;
detect a query regarding the scene;
conduct a re-interpretation of the set of abstract descriptors in response to the query; and
generate a response to the query based on the re-interpretation.

12. The apparatus of claim 11, wherein the re-interpretation is to be conducted via a neural network.

13. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
extract data from multimodal sensor signals associated with a scene;
generate a five-dimensional (5D) representation of the scene, wherein the 5D representation includes a three-dimensional (3D) visual representation, a one-dimensional (1D) temporal representation, and a 1D branch representation;
store the 5D representation as a set of abstract descriptors; and
periodically remove descriptors from the set of abstract descriptors based on a query relevance metric.

14. The apparatus of claim 13, wherein after a predefined period, any unused scene loses one descriptor of the set of abstract descriptors.

15. At least one computer readable storage medium comprising a set of executable program instructions, which when executed by a computing system, cause the computing system to:
extract data from multimodal sensor signals associated with a scene;
generate a five-dimensional (5D) representation of the scene, wherein the 5D representation includes a three-dimensional (3D) visual representation, a one-dimensional (1D) temporal representation, and a 1D branch representation; and
store the 5D representation as a set of abstract descriptors;
wherein properties of objects in the scene are divided into static properties and dynamic properties such that static properties of objects are not sampled for each time sample of the scene,
wherein the 1D branch representation represents ambiguity in the scene resulting from an undefined property for an object in the scene, and
wherein when the undefined property is mandatory, a user is queried to define the property in more detail before generating the 5D representation of the scene.

16. The at least one computer readable storage medium of claim 15, wherein the data is to be extracted via a neural network.

17. The at least one computer readable storage medium of claim 15, wherein the instructions, when executed, further cause the computing system to exclude personally identifiable information from the set of abstract descriptors.

18. At least one computer readable storage medium comprising a set of executable program instructions, which when executed by a computing system, cause the computing system to:
extract data from multimodal sensor signals associated with a scene;
generate a five-dimensional (5D) representation of the scene, wherein the 5D representation includes a three-dimensional (3D) visual representation, a one-dimensional (1D) temporal representation, and a 1D branch representation;
store the 5D representation as a set of abstract descriptors;
detect a query regarding the scene;
conduct a re-interpretation of the set of abstract descriptors in response to the query; and
generate a response to the query based on the re-interpretation.

19. The at least one computer readable storage medium of claim 18, wherein the re-interpretation is to be conducted via a neural network.

20. At least one computer readable storage medium comprising a set of executable program instructions, which when executed by a computing system, cause the computing system to:
extract data from multimodal sensor signals associated with a scene;
generate a five-dimensional (5D) representation of the scene, wherein the 5D representation includes a three-dimensional (3D) visual representation, a one-dimensional (1D) temporal representation, and a 1D branch representation;
store the 5D representation as a set of abstract descriptors; and periodically remove descriptors from the set of abstract descriptors based on a query relevance metric.

21. The at least one computer readable storage medium of claim 20, wherein after a predefined period, any unused scene loses one descriptor of the set of abstract descriptors.

22. A method comprising:
extracting data from multimodal sensor signals associated with a scene;
generating a five-dimensional (5D) representation of the scene, wherein the 5D representation of the scene includes a three-dimensional (3D) visual representation, a one-dimensional (1D) temporal representation, and a 1D branch representation; and
storing the 5D representation as a set of abstract descriptors;
wherein properties of objects in the scene are divided into static properties and dynamic properties such that static properties of objects are not sampled for each time sample of the scene,
wherein the 1D branch representation represents ambiguity in the scene resulting from an undefined property for an object in the scene, and
wherein when the undefined property is mandatory, a user is queried to define the property in more detail before generating the 5D representation of the scene.

23. The method of claim 22, wherein the data is extracted via a neural network.

24. The method of claim 22, further including excluding personally identifiable information from the set of abstract descriptors.

25. A method comprising:
extracting data from multimodal sensor signals associated with a scene;
generating a five-dimensional (5D) representation of the scene, wherein the 5D representation of the scene includes a three-dimensional (3D) visual representation, a one-dimensional (1D) temporal representation, and a 1D branch representation;
storing the 5D representation as a set of abstract descriptors;
detecting a query regarding the scene;
conducting a re-interpretation of the set of abstract descriptors in response to the query; and
generating a response to the query based on the re-interpretation.

26. The method of claim 25, wherein the re-interpretation is conducted via a neural network.

27. A method comprising:
extracting data from multimodal sensor signals associated with a scene;
generating a five-dimensional (5D) representation of the scene, wherein the 5D representation of the scene includes a three-dimensional (3D) visual representation, a one-dimensional (1D) temporal representation, and a 1D branch representation;
storing the 5D representation as a set of abstract descriptors; and
periodically removing descriptors from the set of abstract descriptors based on a query relevance metric.

28. The method of claim 27, wherein after a predefined period, any unused scene loses one descriptor of the set of abstract descriptors.

* * * * *